United States Patent

Shimizu et al.

[15] 3,651,335

[45] Mar. 21, 1972

[54] ELECTRIC CIRCUIT FOR SEQUENTIALLY OPERATING A PLURALITY OF AC LOADS

[72] Inventors: Tetsuji Shimizu; Makoto Iwakura, both of Nagoya, Japan

[73] Assignee: Kabushikikaisha Tokai Rika Denki Seisakusho, Nishikasugai-gun, Aichi Prefecture, Japan

[22] Filed: Nov. 13, 1969

[21] Appl. No.: 876,261

[30] Foreign Application Priority Data

| | | |
|---|---|---|
| Nov. 13, 1968 | Japan | 43/98321 |
| Nov. 13, 1968 | Japan | 43/103577 |
| Feb. 24, 1969 | Japan | 44/15471 |

[52] U.S. Cl. .......................... 307/223 B, 307/252 Q, 328/75, 307/252 B

[51] Int. Cl. .......................... H03k 17/00

[58] Field of Search .......................... 307/220 B–225 B, 307/252.72; 328/75

[56] References Cited

UNITED STATES PATENTS

| | | | |
|---|---|---|---|
| 3,129,344 | 4/1964 | Lemon | 307/220 |
| 3,183,376 | 5/1965 | Boyer | 307/252 |
| 3,294,985 | 12/1966 | Kramasz | 307/224 |
| 3,482,114 | 12/1969 | Marshall | 307/221 |

*Primary Examiner*—Donald D. Forrer
*Assistant Examiner*—David M. Carter
*Attorney*—Woodhams, Blanchard and Flynn

[57] ABSTRACT

An electric circuit for sequentially operating AC loads wherein a plurality of loads are sequentially energized and deenergized substantially simultaneously after said loads are all energized, which consists of a plurality of stages each comprising at least a transistor; a time constant circuit; a Zener diode; and a controlled rectifier element; the Zener current flowing through said Zener diode to a gate of said controlled rectifier element when the voltage at both terminals of a capacitor of said time constant circuit is raised to exceed the voltage predetermined by a time constant of said circuit whereby said controlled rectifier element is turned on, thereby energizing the load. The simultaneous deenergization of the loads is effected at a predetermined time interval after energization of the load of last stage of circuit, and no mechanical type electric contact is used, resulting in elimination of mechanical trouble, so that the operational effect of said circuit is greatly improve, and the range of its application is increased.

10 Claims, 5 Drawing Figures

Fig. 1-A
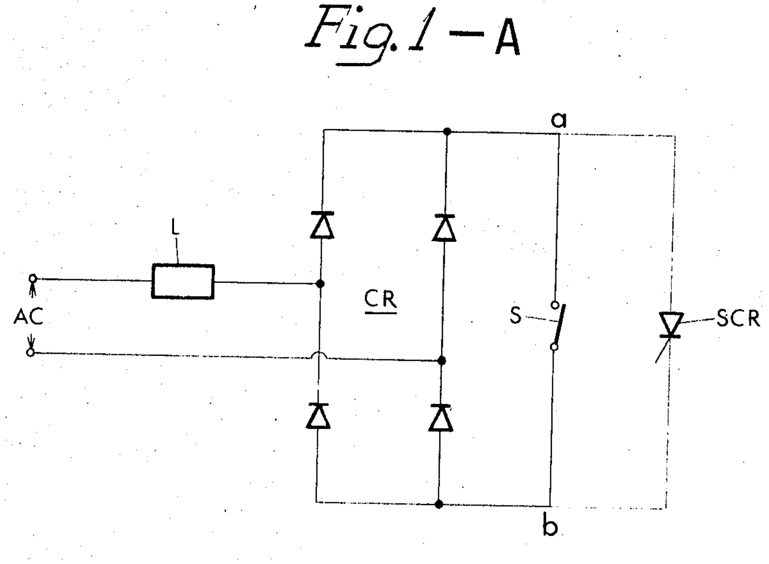
INVENTORS
TETSUJI SHIMIZU
MAKOTO IWAKURA
BY Wenderoth, Blanchard & Flynn
ATTORNEYS Fig. 1-B
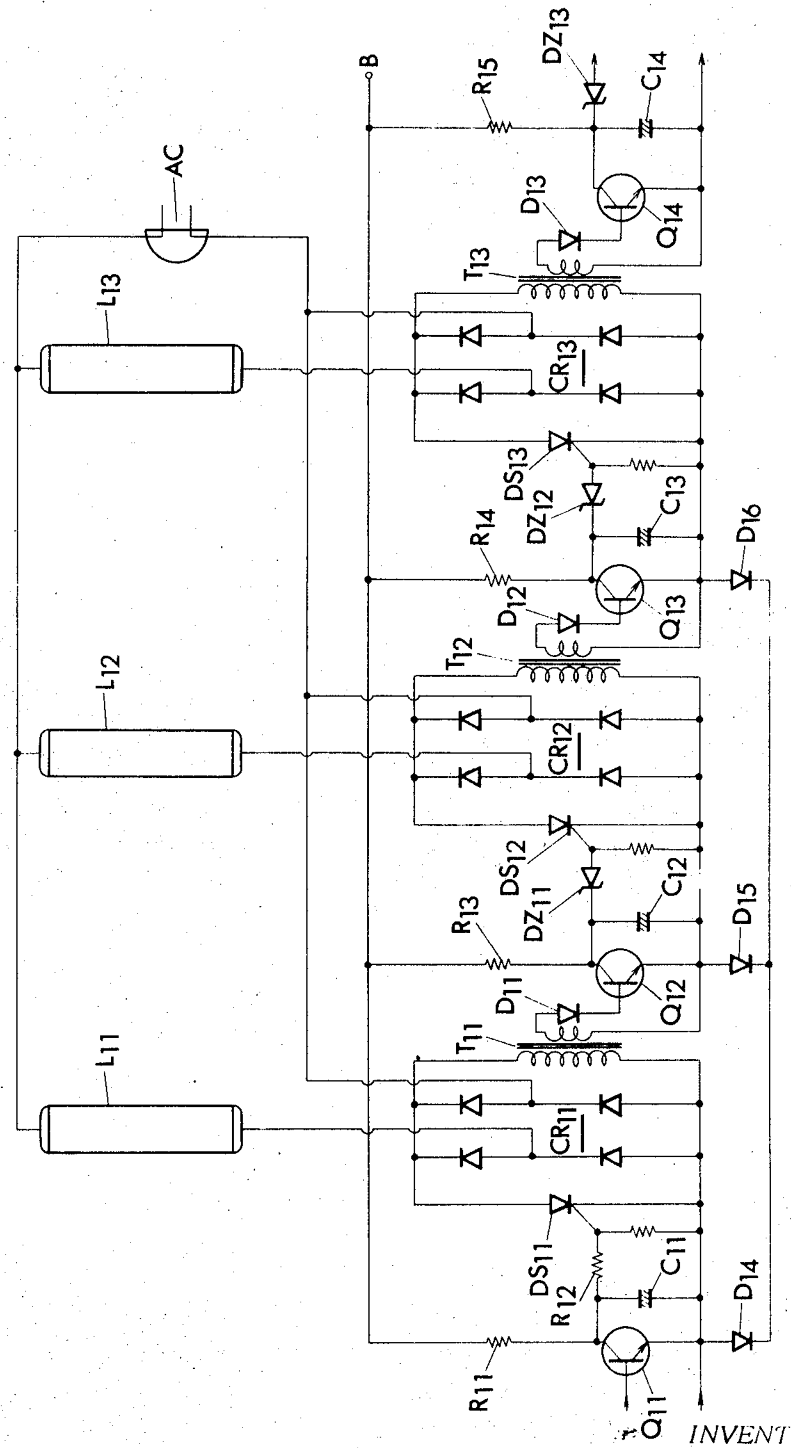
INVENTORS
TETSUJI SHIMIZU
MAKOTO IWAKURA
BY Woodhams, Blanchard & Flynn
ATTORNEYS INVENTORS
TETSUJI SHIMIZU
MAKOTO IWAKURA
BY Woodhams, Blanchard & Flynn
ATTORNEYS INVENTORS
TETSUJI SHIMIZU
MAKOTO IWAKURA
BY
Woodhams, Blanchard & Flynn
ATTORNEYS INVENTORS
TETSUJI SHIMIZU
MAKOTO IWAKURA
BY
Woodhams, Blanchard & Flynn
ATTORNEYS

ELECTRIC CIRCUIT FOR SEQUENTIALLY OPERATING A PLURALITY OF AC LOADS

This invention relates to an electric circuit for operating a plurality of AC loads sequentially, and more particularly to an electric circuit for sequentially energizing a plurality of AC loads such as fluorescent lamps, incandescent lamps, motors and transformers and for substantially simultaneously deenergizing said loads after all the loads have been energized.

An object of the present invention is to provide an electric circuit for sequentially operating a plurality of AC loads, in which AC for commercial use is employed as a power source for operating the loads, instead of a battery of which the power consumption is large, resulting in eliminating the trouble of displacement or charging of a battery.

Another object of the present invention is to provide an electric circuit for sequentially operating a plurality of AC loads, in which said circuit includes no mechanical type electric contacts which often cause mechanical trouble in the circuit, resulting in improving the life of circuit, ensuring the operation thereof and obtaining a simplicity in structure as well.

A further object of the present invention is to provide an electric circuit for operating a plurality of AC loads sequentially, in which said plural AC loads are maintained deenergized for a predetermined period of time, and then, become energized in sequence.

A still further object of the present invention is to provide an electric circuit for operating a plurality of AC loads sequentially which is applicable as a control circuit for a precision apparatus where the simultaneous deenergization of all loads is required, in utilizing the characteristic of the circuit which deenergized all of loads simultaneously after energization of all loads.

A still further object of the present invention is to provide an electric circuit for operating a plurality of AC loads sequentially, in which if there occurs any trouble, such as disconnection in one or more of plural loads, the sequential energization and simultaneous deenergization can be repeatedly effected on the remaining loads excluding the load or loads in trouble.

A still further object of the present invention is to provide an electric circuit for operating a plurality of AC loads in sequence, wherein sequential energization and deenergization of said AC loads are entirely automatically effected, and loads are operated with the AC thereby to entirely eliminate manual operation and improve the versatility of the circuit.

Accordingly, the objects and purposes of the present invention are met by proving an electric circuit for operating AC loads sequentially wherein a plurality of loads are sequentially energized and deenergized substantially simultaneously after said loads are all energized, which consists of a plurality of stages each comprising at least a transistor; a time constant circuit; a Zener diode; and a controlled rectifier element; the Zener current flowing through said Zener diode to a gate of said controlled rectifier element when the voltage at both terminals of capacitor of said time constant circuit is raised to exceed the voltage predetermined by a time constant of said circuit whereby said controlled rectifier element is turned on, thereby energizing the load.

In the accompanying drawings:

FIGS. 1–A and 1–B show an embodiment of the electric circuit of the present invention; wherein FIG. 1–A is a diagram illustrating a principle of a bridge rectifier circuit included in the electric circuit of this embodiment, and FIG. 1–B is an actual circuit diagram of this embodiment;

Figure 2:
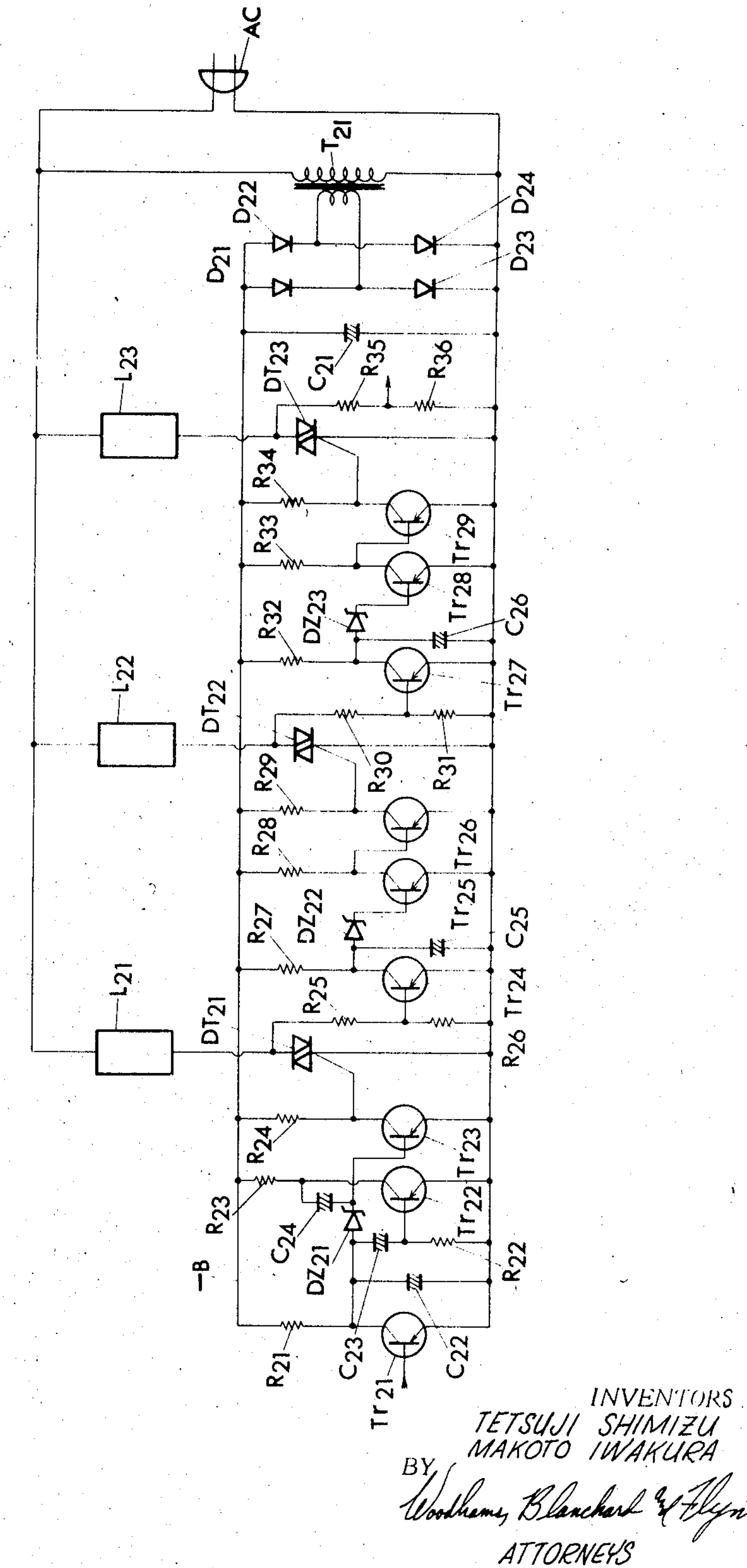
FIG. 2 is a connection diagram of the electric circuit showing another embodiment.

Connections and operations of respective electric circuits will be described with reference to the accompanying drawings.

Referring now to FIGS. 1–A and 1–B, an electric circuit of this embodiment comprises a plurality of stages each comprising a load connected at one of terminals thereof to one of terminals of a power source and at other terminal to one of AC sides of a bridge rectifier circuit, a SCR connected between the DC sides of said bridge rectifier circuit, said SCR turning off the DC side so as to energize the load, said SCR being controlled by a transistor circuit which flows current to a gate of said SCR when the transistor of said circuit becomes nonconductive, said transistor circuit being connected so as to energize said plurality of AC loads sequentially and bias transistors of respective stages conductive to turn off the SCR after said plurality of AC loads are all energized.

Prior to detailed explanation of the connection and operation of the electric circuit according to the embodiment, the principle of control system will be explained in reference to FIG. 1–A. FIG. 1–A shows a basic circuit for controlling energization of AC loads, wherein said electric circuit includes a switch S connected to the DC sides of a diode bridge circuit CR and a load L connected in series to one of AC sides thereof. If the switch S is opened, the AC does not flow, hence the load L is left nonconductive. On the other hand, if the switch S is closed, the AC flows to the load L, thereby energizing the load. In the electric circuit shown in FIG. 1–B, SCR's (such as that shown in FIG. 1–A in parallel with switch S) are employed, instead of the switch S. The voltage between the line *a–b* (FIG. 1–A) becomes zero at every 180° of electrical angle, so that the anode current of the SCR is cut off to stop current flow. Since the gate current is the DC, said SCR's are immediately turned on in one one-hundredth to one one-twentieth second if the voltage between the line *a–b* becomes zero at every 180° of electrical angle.

Referring now to FIG. 1–B loads $L_{11}$, $L_{12}$, $L_{13}$, such as a fluorescent lamp including therein a leakage transformer, are each connected at one of terminals thereof to one terminal of an AC power source AC in parallel. The other terminal of AC power source is connected to one of AC sides of each of the parallel diode bridge rectifier circuits $CR_{11}$, $CR_{12}$ and $CR_{13}$. Said diode bridge rectifier circuits $CR_{11}$ – $CR_{13}$ are also connected at other of their AC sides to the other terminals of said loads $L_{11}$ – $L_{13}$, respectively. To a line B of a DC power source circuit, resistors $R_{11}$, $R_{13}$, $R_{14}$ and $R_{15}$ are connected in parallel with each other and collectors of transistors $Q_{11}$, $Q_{12}$, $Q_{13}$, and $Q_{14}$ are respectively connected through said resistors $R_{11}$, $R_{13}$, $R_{14}$, $R_{15}$. Between ground and the collectors of transistors $Q_{11}$, $Q_{12}$, $Q_{13}$ and $Q_{14}$, capacitors $C_{11}$, $C_{12}$, $C_{13}$ and $C_{14}$ are interconnected, respectively. Disposed between both terminals of the DC side of said respective rectifier circuits $CR_{11}$ – $CR_{13}$ are SCR's $Ds_{11}$, $Ds_{12}$ and $Ds_{13}$, respective of which is connected to a primary side of each transformers $T_{11}$, $T_{12}$, $T_{13}$. A gate of the SCR $Ds_{11}$ is connected to the collector of transistor $Q_{11}$ through a resistor $R_{12}$. The gates of other SCRs $Ds_{12}$ and $Ds_{13}$ are connected to collectors of transistors $Q_{12}$ and $Q_{13}$ through Zener diodes $DZ_{11}$ and $DZ_{12}$, respectively.

Bases of transistors $Q_{12}$, $Q_{13}$ and $Q_{14}$ are each connected to one of the terminals of the secondary sides of transformers $T_{11}$ – $T_{13}$ through diodes $D_{11}$, $D_{12}$ and $D_{13}$, respectively in the forward direction, and emitters thereof are each connected to other of terminals of secondary sides of said transformers $T_{11}$ – $T_{13}$. Emitters of respective transistors $Q_{11}$ – $Q_{13}$ are connected each other through diodes $D_{14}$, $D_{15}$ and $D_{16}$ in the forward direction. Connection of the transistor $Q_{14}$ of the last stage with the transistor $Q_{11}$ of the first stage of this circuit is such that the collector of transistor $Q_{14}$ is connected to the base of transistor $Q_{11}$ through the Zener diode $Dz_{13}$, and the emitter of the former is connected to that of the latter. Transformers $T_{11}$ – $T_{13}$ are employed for the purpose of electrically separating one circuit from another, since the loads $L_{11}$ – $L_{13}$ are operated with the AC. A shunt circuit including diodes $D_{14}$ – $D_{16}$ is provided so as not to turn off one circuit of transistors $Q_{11}$ – $Q_{13}$ separated from another by a negative line of the DC power source. Since the pulsating DC passing the zero value at every 180° of electrical angle flows to each transformer $T_{11}$, $T_{12}$ or $T_{13}$, said transformers are designed so as not to be saturated.

Hence, the pulse having twice as high as the frequency of power source is obtained at the secondary side thereof.

The operation of this circuit is as follows.

When the power sources AC and DC are closed, current flows to the primary side of each transformer $T_{11}$, $T_{12}$ or $T_{13}$ of each diode bridge rectifier circuit $CR_{11}$, $CR_{12}$ or $CR_{13}$, but current is not so sufficient as to energize respective loads $L_{11}$ – $L_{13}$. However, the pulse current is provided at the secondary side of each transformer $T_{11}$, $T_{12}$ or $T_{13}$ and flows to transistors $Q_{12}$, $Q_{13}$ and $Q_{14}$ through diodes in the forward direction, thereby biasing said transistors conductive. As soon as said transistors become conductive, the capacitors $C_{12}$ – $C_{14}$ start discharging, hence respective SCRs $Ds_{12}$ and $Ds_{13}$ are left as they are in the off position and accordingly loads $L_{11}$ – $L_{13}$ are not yet energized. It is noted that the transistor $Q_{11}$ of the first stage of circuit is nonconductive at this time. But the transistor $Q_{14}$ of the last stage becomes conductive, and charging to the capacitor $C_{11}$ starts through the resistor $R_{11}$. When the charging voltage in said capacitor $C_{11}$ is raised to exceed a predetermined voltage, current flows to the gate of SCR $Ds_{11}$ through the resistor $R_{12}$ to turn on said SCR, so that current flows through the rectifier circuit $CR_{11}$ to energize the load $L_{11}$.

When said load $L_{11}$ becomes energized, the primary side of transformer $T_{11}$ is turned off by the SCR $Ds_1$, hence the pulse signal is not provided at the secondary side thereof, and consequently the transistor $Q_{12}$ is biased to become nonconductive. The capacitor $C_{12}$, therefore, starts charging through the resistor $R_{13}$. When the charging voltage of the capacitor is raised to exceed the voltage of Zener diode $Dz_{11}$, the Zener current flows through said Zener diode $DZ_{11}$, so that current flows to the gate of SCR $Ds_{12}$, whereby said SCR becomes conductive to flow current through the rectifier circuit $CR_{12}$, thereby energizing the load $L_{12}$.

The load $L_{13}$ becomes energized in the same way as in the preceding circuit. The time interval between the energization of load $L_{11}$ of the preceding circuit and that of the load $L_{12}$ of the succeeding circuit depends upon a predetermined voltage of Zener diode $DZ_{11}$ and a time constant of the time constant circuit consisting of resistor $R_{13}$ and capacitor $C_{12}$.

When the load $L_{13}$ is energized, the transistor $Q_{14}$ becomes nonconductive, and the capacitor $C_{14}$ is charged through the resistor $R_{15}$. When the charging voltage thereof is raised to exceed the voltage of Zener diode $DZ_{13}$, current flows to the base of transistor $Q_{11}$ to bias said transistor conductive, so that the capacitor $C_{11}$ discharges to cut off the current flow to the gate of SCR $Ds_{11}$. On the other hand, the pulsating current normally passing the zero value flows through respective SCRs $Ds_{11}$, $Ds_{12}$ and $Ds_{13}$ and the holding current flowing through the SCR $Ds_{11}$ is cut off at the nil voltage at a certain point within the cycle of 100 – 120 c./s., so that the load $L_{11}$ becomes deenergized.

As soon as the load $L_{11}$ is deenergized, only a small quantity of current flows to the primary side of transformer $T_{11}$, so that the load $L_{11}$ is left as it is deenergized. Accordingly, pulse is provided at the secondary side of transformer $T_{11}$ and thereby the transistor $Q_{12}$ is biased to become conductive through the diode $D_{11}$ in the forward direction. In consequence, the capacitor $C_{12}$ is turned off to discharge, so that current flowing to the gate of SCR $Ds_2$ is cut off, and the load $L_{12}$ becomes deenergized in the same way as set forth in the foregoing.

Similarly the load $L_{13}$ becomes deenergized. The time interval from deenergization of preceding load to that of the succeeding load is hardly perceptible, since it takes only one one-hundredth to one one-twentieth second to turn off all of capacitors $C_{11}$ – $C_{13}$, hence it seems as if plural loads were all deenergized simultaneously. After all of loads $L_{11}$ – $L_{13}$ are deenergized, the circuit is rectured to the state same as the power sources are initially closed, and the operation as set forth is repeated continually.

Referring now to FIG. 2 showing another embodiment, the electric circuit for operating plural loads sequentially comprising a plurality of stages each comprising the AC load connected at one terminal thereof to one of terminals of a power source and at the other terminal to an anode of triac, and a transistor circuit connected to a gate of triac, and including a Zener diode and time constant circuit which flow the gate current to energize a corresponding load at a certain time interval after the load of preceding stage is energized, and cuts off the gate current to deenergize the corresponding load substantially simultaneously when the load of preceding stage is deenergized; and another stage connected to transistor circuit of first stage, said another circuit rendering the triac of first stage turn off so as not to flow current to the load only for a period of time while charging to a capacitor of time constant circuit is being effected after the load of last stage becomes deenergized.

In the drawing, one terminal of the AC power source is connected to one of terminals of respective plural loads $L_{21}$, $L_{22}$ and $L_{23}$, such as a fluorescent lamp containing therein a leakage transformer, and a primary side of a transformer $T_{21}$ in parallel therewith. The other terminal of the primary side of said transformer $T_{21}$ is connected to other terminal of the AC power source. To the secondary side of said transformer $T_{21}$ a diode bridge circuit including diodes $D_{21}$ – $D_{24}$ is connected. Reference $C_{21}$ is a capacitor for filtering.

References $Dt_{21}$ – $Dt_{23}$ are triacs which are interconnected between said loads $L_{21}$, $L_{22}$ and $L_{23}$ and ground. $Tr_{21}$ – $Tr_{29}$ designate PNP transistors; the emitter of transistor $Tr_{21}$ of the first stage is grounded and collector thereof is connected to the line B of DC power source through a resistor $R_{21}$. Between the collector and ground a capacitor $C_{22}$ is interconnected; a capacitor $C_{23}$ is connected between said collector and base of transistor $Tr_{22}$; and a Zener diode $DZ_{21}$ is connected between said collector and base of transistor $Tr_{23}$. The base of transistor $Tr_{22}$ is grounded through a resistor $R_{22}$; the emitter thereof is directly grounded, and the collector thereof is connected to the line B through a resistor $R_{23}$. Between said collector and the base of transistor $Tr_{23}$ a capacitor $C_{24}$ is interconnected. The emitter of transistor $Tr_{23}$ is grounded, and the collector thereof is connected to the line B through a resistor $R_{14}$ and a gate of triac $Dt_{21}$.

$Tr_{24}$ is the PNP transistor of the second stage, of which the emitter is grounded, of which the base is connected through a resistor $R_{25}$ to a junction point of the load $L_{21}$ with the triac $DT_{21}$ and grounded through a resistor $R_{26}$, and of which the collector is connected through a resistor $R_{27}$. Between said collector and ground a capacitor $C_{25}$ is connected, and between said collector and the base of the transistor $Tr_{25}$ a Zener diode $DZ_{22}$ is also connected. The emitter of transistor $Tr_{25}$ is grounded, and the collector thereof is connected to the line B through a resistor $R_{28}$, and also to the base of transistor $Tr_{26}$. The emitter of transistor $Tr_{26}$ is grounded, and the collector thereof is connected to the line B through a resistor $R_{29}$ and also to a gate of triac $Dt_{22}$.

The circuit of the third stage has an entirely similar connection to the second stage, wherein transistors $Tr_{27}$ – $Tr_{29}$ correspond to transistor $Tr_{24}$ – $Tr_{26}$ of the second stage, resistors $R_{31}$ – $R_{34}$ to resistors $R_{25}$ – $R_{29}$, and a capacitor $C_{26}$ to the capacitor $C_{25}$, respectively. It is noted that a junction point of resistors $R_{35}$ and $R_{36}$ connected in series between a junction point of the load $L_{23}$ with triac $Dt_{23}$ and ground is connected to the base of said transistor $Tr_{21}$ of the first stage.

The thus connected electric circuit operates as follows.

If the AC power source is closed, respective loads $L_{21}$, $L_{22}$ and $L_{23}$ are not yet energized, hence, transistors $Tr_{21}$, $Tr_{24}$, $Tr_{27}$ become conductive and capacitors $C_{22}$, $C_{25}$ and $C_{26}$ start discharging.

In the meantime, as soon as the power source is closed, charging to the capacitor $C_{24}$ starts by a time constant of said capacitor $C_{24}$ and resistor $R_{23}$ through the transistor $Tr_{23}$. Thus, said transistor $Tr_{23}$ becomes conductive between the emitter and collector thereof. When the charging to said capacitor $C_{24}$ is completed, the base current of transistor $Tr_{23}$ is cut off, hence said transistor becomes nonconductive. Consequently, current flows to the gate of triac $Dt_{21}$ through the resistor $R_{24}$, so that said triac is turned on to flow current to the load $L_{21}$, thereby energizing said load $L_{21}$. Owing to the energization of load $L_{21}$, the transistor $Tr_{24}$ is biased nonconductive, hence the charging to capacitor $C_{25}$ starts through the resistor $R_{27}$. When the charging voltage of said capacitor $C_{25}$ is raised to exceed the Zener voltage of Zener diode $DZ_{22}$, the Zener current flows to the base of transistor $Tr_{25}$ to bias the transistor $Tr_{25}$ conductive. With the transistor $Tr_{25}$ becoming conductive, the transistor $Tr_{26}$ is biased nonconductive in return, so that current flows to the gate of triac $Dt_{22}$ through the resistor $R_{29}$ to turn on said triac $Dt_{22}$, thereby energizing the load $L_{22}$. Due to the energization of load $L_{22}$, the transistor $Tr_{27}$ becomes nonconductive, while the capacitor $C_{26}$ is charged. When the charging voltage of said capacitor $C_{26}$ is raised to exceed the voltage of Zener diode $DZ_{23}$, current flows to the base of transistor $Tr_{28}$ to bias said transistor $Tr_{28}$ conductive. With the transistor $Tr_{28}$ becoming conductive, the transistor $Tr_{29}$ is biased to become nonconductive, so that current flows to the gate of triac $Dt_{23}$ through the resistor $R_{34}$ to turn on the triac $Dt_{23}$, thereby energizing the load $L_{23}$.

The time interval between the energization of load $L_{21}$ and that of load $L_{22}$ is positively maintained by the capacitor $C_{25}$, resistor $R_{27}$ and Zener diode $DZ_{22}$, and time interval between the energization of load $L_{22}$ and that of load $L_{23}$ is positively maintained by the capacitor $C_{26}$, resistor $R_{32}$ and Zener diode $DZ_{23}$.

As soon as the load $L_{23}$ of the last stage is energized, the transistor $Tr_{21}$ become nonconductive, and the voltage of capacitor $C_{22}$ rises. It is noted that the transistor $Tr_{22}$, at this instance, is kept conductive due to the charging voltage of capacitor $C_{23}$. It is also noted that the capacitor $C_{24}$ is being charged inversely with respect to said capacitor $C_{23}$. When the charging voltage of capacitor $C_{22}$ is raised to exceed the voltage of Zener diode $DZ_{21}$, current flows to the base of transistor $Tr_{23}$ to bias said transistor conductive, so that the gate potential of triac $DT_{21}$ becomes equal to the potential of cathode thereof, hence the triac $DT_{21}$ is turned off, thereby cutting off the current flowing to the load $L_{21}$.

When the load $L_{21}$ becomes deenergized, current flows to the base of transistor $Tr_{24}$ to make said transistor $Tr_{24}$ conductive. In turn, the transistor $Tr_{25}$ becomes nonconductive, while the transistor $Tr_{26}$ becomes conductive, so that the triac $DT_{22}$ is caused to be turned off, similarly to the triac $DT_{21}$, thereby deenergizing the load $L_{22}$.

The load $L_{23}$ of the third stage is deenergized in the same way as set forth in the second stage. The deenergization of those loads $L_{21}$ to $L_{23}$ is effected in sequence within the extremely shortest time of one-fiftieth – one-sixtieth second, so that the time lag is not perceptible as if those loads were deenergized all at once.

It must be noted that the transistor $Tr_{22}$ is disposed in the circuit. Unless the transistor $Tr_{22}$ is provided, the time interval after all loads are deenergized and until these loads are again all energized would be too short to appreciate it, since as soon as the load of the last stage is deenergized, the transistor $Tr_{21}$ becomes conductive, and the transistor $Tr_{23}$, in turn, becomes nonconductive, so that the triac $DT_{21}$ is immediately turned on to energize the load $L_{21}$. In other words, the transistor $Tr_{22}$ is provided for prolonging the time interval from the deenergization of all loads to the subsequent energization thereof. That is to say, when the load $L_{23}$ of the last stage is deenergized and the transistor $Tr_{21}$ becomes conductive, the polarity of capacitor $C_{23}$ is inverted while the base potential of $TR_{22}$ is dropping to the emitter potential thereof. Accordingly, the transistor $Tr_{22}$ becomes instantaneously nonconductive and the capacitor $C_{24}$ is immediately turned on to be charged. By charging to the capacitor $C_{24}$, the base current of transistor $Tr_{23}$ is retained for a while, so that the bias of the transistor $Tr_{23}$ to the nonconductive state is somewhat retarded until charging to the capacitor $C_{24}$ is completed and the base current of transistor $Tr_{23}$ is cut off. Thus, there is a certain lapse of time since the deenergization of load $L_{23}$ until the energization of load $L_{21}$ of the first stage. Of course, the transistor $Tr_{23}$ becomes nonconductive if the base current thereof is cut off. The operation following this is just the same as the initial operation.

The electric circuit of this embodiment can draw a sharp distinction between energization and deenergization of loads by providing a means for leaving all loads deenergized for a certain period of time, so that energization of first load is effected at a certain interval after all loads are deenergized. This will enhance the operational effect of the circuit.

Figure 3:
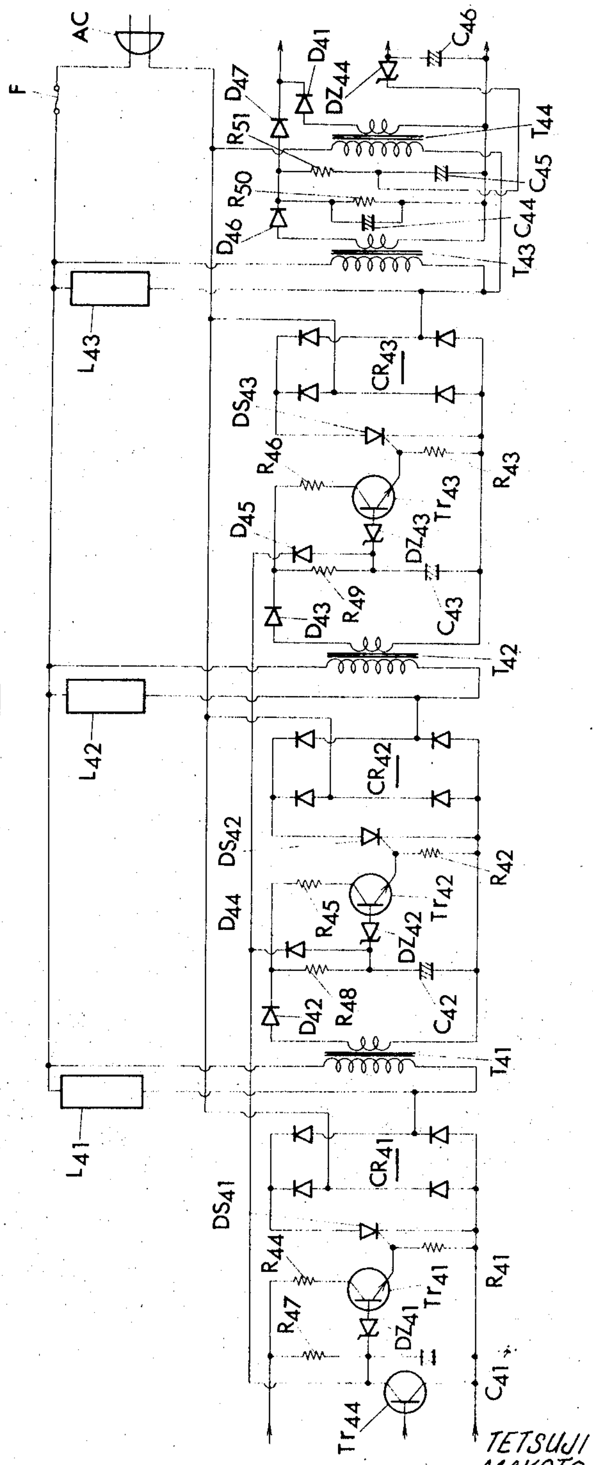
FIG. 3 is a connection diagram of the electric circuit of a further embodiment.

A further embodiment of the electric circuit according to the present invention is shown in FIG. 3, wherein said electric circuit which consists of a plurality of stages and a control circuit; said plurality of stages each including an AC load connected at one terminal thereof to one terminal of power source and at the other terminal to one of AC sides of a bridge rectifier circuit and to one terminal of primary side of transformer, a time constant circuit, a transistor adapted to be biased conductive through a Zener diode, and a SCR adapted to be turned on with the transistor becoming conductive to energize the load, said time constant circuit, transistor and SCR being connected to a secondary side of said transformer; said control circuit including a transformer causing all of capacitors of said time constant circuit to discharge to bias the transistors nonconductive, so that the SCR is turned off, thereby deenergizing all of loads, a time constant circuit, and a transistor.

In FIG. 3, loads $L_{41}$, $L_{42}$, $L_{43}$, such as incandescent lamps, motors, transformers or fluorescent lamps provided with a preheater unit, are each connected at one of their terminals to one terminal of an AC power source. The other terminals of said loads $L_{41}$, $L_{42}$ and $L_{43}$ are each connected to one terminal of said AC power source AC through the primary sides of transformers $T_{41}$, $T_{42}$ and $T_{43}$.

The other terminal of the AC power source is connected to one of the AC sides of diode bridge rectifier circuit $CR_{41}$, $CR_{42}$ and $CR_{43}$, and the other AC sides of said rectifier circuits $CR_{41}$, $CR_{42}$ and $CR_{43}$ are connected to junction points of loads $L_{41}$, $L_{42}$ and $L_{43}$ with transformers $T_{41}$, $T_{42}$ and $T_{43}$, respectively. SCR's $Ds_{41}$, $Ds_{42}$ and $Ds_{43}$ are interconnected between both terminals of DC sides of respective bridge rectifier circuits $CR_{41}$ – $CR_{43}$, respectively. Gates of respective SCRs, $Ds_{41}$, $Ds_{42}$ and $Ds_{43}$ are connected to emitters of NPN transistors $Tr_{41}$, $Tr_{42}$ and $Tr_{43}$ and resistors $R_{41}$, $R_{42}$ and $R_{43}$. One side of each of said resistors $R_{41}$, $R_{42}$, $R_{43}$ is grounded.

Collectors of transistors $Tr_{41}$ – $Tr_{43}$ are connected to one of the terminals of secondary sides of transformers $T_{44}$, $T_{41}$ and $T_{42}$ through resistors $R_{44}$, $R_{45}$ and $R_{46}$ and diodes $D_{41}$, $D_{42}$ and $D_{43}$, respectively. The other terminals of secondary sides of transformers $T_{44}$, $T_{41}$ and $T_{42}$ are connected to the negative sides of respective rectifier circuits $CR_{41}$ – $CR_{43}$, respectively. Between the respective junction points of resistors $R_{44}$, $R_{45}$ and $R_{46}$ with the diodes $D_{41}$, $D_{42}$, $D_{43}$ and the negative side, resistors $R_{47}$, $R_{48}$ and $R_{49}$ and capacitors $C_{41}$, $C_{42}$ and $C_{43}$ which are respectively in series connection with each other are interconnected. The junction points of said resistors $R_{47}$ – $R_{49}$ with capacitors $C_{41}$ – $C_{43}$ are connnected to bases of transistors $Tr_{41}$ – $Tr_{43}$ through Zener diodes $DZ_{41}$, $DZ_{42}$ and $DZ_{43}$, respectively. References $D_{44}$ and $D_{45}$ designate diodes which are connected between the collector, of transistor $Tr_{44}$ and the respective junction points of said resistor $R_{48}$ with capacitor $C_{42}$, and of the resistor $R_{49}$ with capacitor $C_{43}$.

The last stage is a circuit for controlling deenergization of load, in which one terminal of the primary side of transformer $T_{43}$ is connected to one terminal of the primary side of transformer $T_{44}$, while the other terminal of primary side of said transformer $Tr_{44}$ is connected to one terminal of the AC power source AC. A diode $D_{46}$ is connected to one terminal of secondary side of transformer $T_{43}$, while a resistor $R_{50}$ and capacitor $C_{44}$ in parallel with each other and a resistor $R_{51}$ and capacitor $C_{45}$ in series connection are connected between said diode $D_{46}$ and the other terminal of secondary side of transformer $T_{43}$. The junction point of said resistor $R_{41}$ with capacitor $C_{45}$ is connected to the base of transistor $Tr_{44}$ through the Zener diode $DZ_{44}$. Between the emitter and base of transistor $Tr_{44}$ a capacitor $C_{46}$ is connected and said emitter is connected to the negative side. Reference $D_{47}$ is a diode which is connected between the diode $D_{41}$ and resistor $R_{51}$ and reference F is a fuse.

Operation of this circuit is as follows.

If the power source AC is closed, current does not flow to loads $L_{41}$ – $L_{43}$ at an initial stage, hence these loads are not yet energized. Since the load $L_{43}$ is not energized, the voltage at the secondary side of transformer $T_{43}$ stands zero. However, there is provided a secondary voltage at the secondary side of transformer $T_{44}$ which is determined by the impedance of transformer $T_{43}$. With said voltage, charging to capacitor $C_{41}$ starts through the diode $D_{41}$ and resistor $R_{47}$. When the voltage of said capacitor $C_{41}$ is raised to exceed the Zener voltage of Zener diode $DZ_{41}$, the Zener current flows to the base of transistor $Tr_{41}$, so that said transistor $Tr_{41}$ becomes conductive. As soon as the transistor $Tr_{41}$ becomes conductive, current flows to the gate of SCR $Ds_{41}$ through the resistor $R_{44}$ to turn on the SCR $Ds_{41}$ thereby energizing the load $L_{41}$.

As soon as the load $L_{41}$ is energized, current flows to the primary side of transformer $T_{41}$ connected in parallel with said load $L_{41}$, so that the secondary voltage is produced at the secondary side thereof. By the secondary voltage, charging to the capacitor $C_{42}$ starts through the diode $D_{42}$ and resistor $R_{48}$. When the voltage of capacitor $C_{42}$ is raised to exceed the Zener voltage of Zener diode $DZ_{42}$, the Zener current flows to the base of transistor $Tr_{42}$, to bias the transistor $Tr_{42}$ conductive. With the transistor $Tr_{42}$ becoming conductive, current flows to the gate of SCR $Ds_{42}$ to turn on said SCR, thereby energizing the load $L_{42}$.

The circuit of succeeding stage operates similarly to energize the load $L_{43}$. The time interval after energization of the load of preceding stage until that of the load of succeeding stage depends upon the voltage predetermined by the Zener diode and the time constant of resistor and capacitor. For example, the time interval from the energization of the load $L_{41}$ until the subsequent energization of load $L_{42}$ is determined by the voltage predetermined by the Zener diode $DZ_{42}$ and the time constant of resistor $R_{48}$ and capacitor $C_{42}$.

When the load $L_{43}$ is energized, current flows to the primary side of transformer $T_{43}$ connected in parallel with said load $L_{43}$, so that the secondary voltage generates at the secondary side thereof. By said secondary voltage, charging to the capacitor $C_{45}$ starts through the diode $D_{46}$ and resistor $R_{51}$. However, in the transformer $T_{44}$, the primary side is turned off by the rectifier circuit $CR_{43}$, so that the secondary voltage becomes zero, and current flowing to the gate of SCR $Ds_{41}$, is cut off. This will result in deenergization of load $L_{41}$ immediately after the load $L_{43}$ is energized. In order to rotard deenergization of the load $L_{41}$ after the energization of load $L_{43}$, current is applied to the gate of said SCR $Ds_{41}$ from the secondary side of transformer $T_{43}$ through the diode $D_{47}$.

Thus, when the voltage of said capacitor $C_{45}$ is raised to exceed the Zener voltage of Zener diode $DZ_{44}$, the Zener current flows to the base of transistor $Tr_{44}$ to bias the transistor conductive. Consequently, the capacitor $C_{41}$ starts discharging, and the capacitors $C_{42}$ and $C_{43}$ start discharging through the diodes $D_{44}$ and $D_{45}$, respectively, so that transistors $Tr_{41}$ – $Tr_{43}$ become nonconductive hence the gate current of SCRs $Ds_{41}$ – $Ds_{43}$ are cut off, thereby turning off said SCRs $Ds_{41}$ – $Ds_{43}$ all simultaneously. Accordingly all loads $L_{41}$ – $L_{43}$ become deenergized simultaneously.

After all loads $L_{41}$ – $L_{43}$ are deenergized, the circuit is restored to the initial state where the AC power source is just closed, and the operation as set forth in the foregoing passages is continually repeated.

A means for controlling or retarding deenergization of a load which is included in this electric circuit permits a versatile application of said circuit; for example the electric circuit of this embodiment is applicable as a control circuit in a precision device where a simultaneous deenergization of all loads is required.

Figure 4:
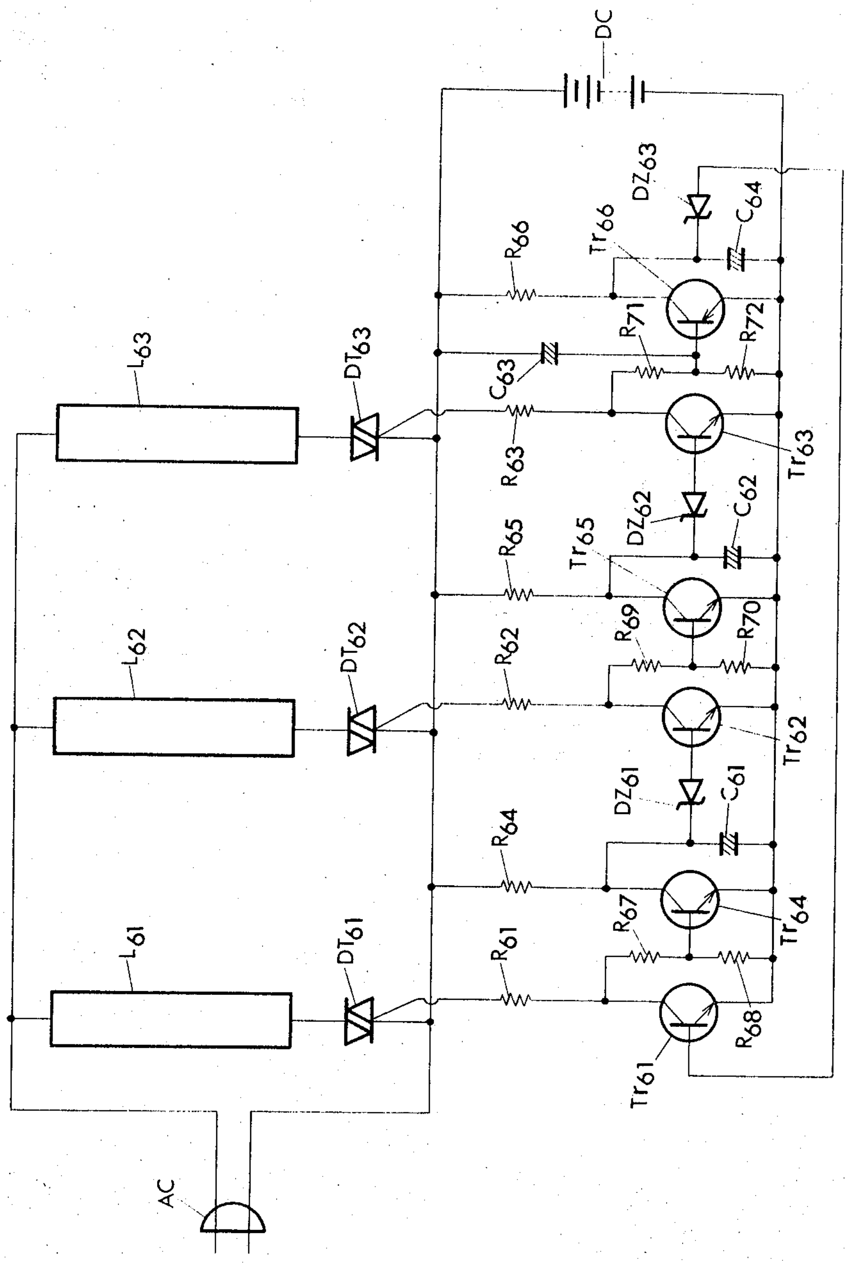
FIG. 4 is a connection diagram of the electric circuit showing a still further embodiment of the present invention.

FIG. 4 shows an electric circuit of a still further embodiment of the present invention, wherein said electric circuit comprises a plurality of loads and triacs in series connection with each other connected in parallel to the AC power source, transistor circuits each including transistors becoming conductive through a time constant circuit and a Zener diode when a transistor of the preceding stage becomes nonconductive and connected to gates of said triacs, said triacs being triggered by the transistors, irrespective of trigger of the triac of preceding stage, thereby energizing a load.

The circuit connection of this embodiment will be explained with reference to FIG. 4.

Reference AC is an AC power source. Between both terminals of said power source, loads and triacs respectively in series connection, $L_{61}$ and $DT_{61}$, $L_{62}$ and $DT_{62}$ and $DT_{53}$ are interconnected.

Reference DC designates a DC power source which may be a battery or a rectified AC. The positive side of said DC power source in common to one electrode of the AC power source, that is to say, an electrode of the terminal to which triacs $DT_{61}$ – $DT_{63}$ are connected.

References $R_{61}$, $R_{62}$ and $R_{63}$ are resistors which are connected between gates of triacs $DT_{61}$ – $DT_{63}$ and collectors of NPN transistors $Tr_{61}$, $Tr_{62}$ and $Tr_{63}$. References $R_{54}$ and $R_{65}$ are resistors which are connected between the positive electrode of the DC power source and collectors of NPN transistors $Tr_{64}$ and $Tr_{65}$. A resistor $R_{66}$ is connected between the positive electrode of the DC power source and the collector of PNP transistor $Tr_{66}$. The collector of transistor $Tr_{51}$ is connected to a resistor $R_{67}$, to one terminal of which the base of transistor $Tr_{64}$ and a resistor $R_{68}$ are connected. Said resistor $R_{68}$ and the emitter of transistor $Tr_{61}$ are grounded. A capacitor $C_{61}$ is interconnected between the collector of transistor $Tr_{64}$ and ground. Said collector of transistor $Tr_{64}$ is connected to the base of transistor $Tr_{62}$ through a Zener diode $DZ_{61}$.

The collector of transistor $Tr_{62}$ is connected to a resistor $R_{69}$, to one terminal of which the base of transistor $Tr_{65}$ and resistor $R_{70}$ are connected. Said resistor $R_{70}$ and the emitter of transistor $Tr_{62}$ are grounded. Between the collector of transistor $Tr_{65}$ and ground a capacitor $C_{52}$ is connected, and said collector of transistor $Tr_{65}$ is connected to the base of transistor $Tr_{63}$ through a Zener diode $DZ_{62}$.

The collector of transistor $Tr_{63}$ is connected to a resistor $R_{71}$, to one terminal of which the base of transistor $Tr_{66}$, a resistor $R_{72}$ and a capacitor $C_{63}$ are connected. Said resistor $R_{72}$ and the emitter of transistor $Tr_{63}$ are grounded, and one terminal of capacitor $C_{63}$ is connected to the positive electrode of DC power source. A capacitor $C_{64}$ is connected between the collector of transistor $Tr_{66}$ and ground, and said collector is connected to the base of transistor $Tr_{61}$ through a Zener diode $DZ_{63}$.

Operation is as follows.

When the AC and DC power sources are closed, current flows to bases of transistors $Tr_{64}$ and $Tr_{65}$ through corresponding triacs and resistors, $DT_{61}$ and resistors $R_{61}$ and $R_{67}$, and $DT_{62}$ and resistors $R_{62}$ and $R_{67}$, so that the respective transistors $Tr_{64}$ and $Tr_{65}$ become conductive. It is noted that although the base current flows to gates of triacs $DT_{61}$ and $DT_{62}$, the base current is not sufficient to make said triacs $DT_{61}$ and $DT_{62}$ turn on. Accordingly, the loads $L_{61}$ – $L_{63}$ are not yet energized.

In the meantime, the transistor $Tr_{66}$ is left as it is nonconductive since said transistor is of a PNP type, and therefore, charging to the capacitor $C_{64}$ is effected through the resistor $R_{66}$. When the charging voltage of said capacitor $C_{64}$ is raised to exceed the Zener voltage of Zener diode $DZ_{63}$, the Zener current flows to the base of transistor $Tr_{61}$, thereby biasing said transistor conductive. With this, current flows to the gate of triac $Dt_{61}$ through the resistor $R_{61}$ to turn on the triac $Dt_{61}$, so that the AC voltage is impressed onto both terminals of load $L_{61}$, thereby energizing the load $L_{61}$.

As soon as the transistor $Tr_{61}$ becomes conductive, current flowing to the base of transistor $Tr_{64}$ is cut off, so that the transistor $Tr_{64}$ becomes nonconductive, while charging to the capacitor $C_{61}$ starts through the resistor $R_{64}$. When the charging voltage thereof is raised to exceed the Zener voltage of Zener diode $DZ_{61}$, the Zener current flows to the base of transistor $Tr_{62}$, to bias said transistor conductive. With this, the load $L_{62}$ is energized in the same way as set forth in the foregoing passage, and thereafter the transistor $Tr_{65}$ is biased nonconductive. Consequently, the capacitor $C_{62}$ is charged, so that current flows through the Zener diode $DZ_{62}$ to bias the transistor $Tr_{63}$ conductive. With the transistor $Tr_{63}$ becoming conductive, the triac $DT_{63}$ is turned on, thereby energizing the load $L_{63}$. Thus, loads $L_{61}$ – $L_{63}$ are now all energized, and the transistor $Tr_{63}$ is conductive, hence the capacitor $C_{63}$ is charged through the resistors $R_{71}$ and $R_{72}$.

When said charging voltage thereof is raised to a certain value, the transistor $Tr_{66}$ is biased conductive, so that charging to the capacitor $C_{64}$ is stopped, and current flowing to the base of transistor $Tr_{61}$ is cut off. Thus, the transistor $Tr_{61}$ is biased nonconductive, and resultantly, the triac $DT_{61}$ is also turned off, thereby deenergizing the load $L_{61}$. With this, the transistor $Tr_{64}$ becomes conductive and the capacitor $C_{61}$ starts discharging, so that the Zener diode $DZ_{61}$ and the transistor $Tr_{62}$ are turned off. Thus, the load $L_{62}$ is deenergized, in the same way as set forth in the foregoing. Likewise, the transistor $Tr_{65}$ becomes conductive and the capacitor $C_{62}$ discharges, so that the transistor $Tr_{63}$ becomes nonconductive, thereby deenergizing the load $L_{63}$. All loads $L_{61}$ – $L_{63}$ are not in deenergization.

After the transistor $Tr_{63}$ becomes conductive, the transistor $Tr_{66}$ also becomes conductive, thus the circuit is restored to the initial condition where the power sources AC and DC were just closed.

Then, charging to the capacitor $C_{64}$ again starts through the resistor $R_{66}$, and respective loads $L_{61}$ – $L_{63}$ are sequentially energized according to the operation as described hereinabove. It must be noted that, in deenergization of loads $L_{61}$ – $L_{63}$, transistors $Tr_{61}$ – $Tr_{65}$ are instantaneously inverted and triacs $DT_{61}$ – $DT_{63}$ are instantaneously turned off as well, so that plural loads $L_{61}$ – $L_{63}$ become all deenergized substantially simultaneously.

The electric circuit of this embodiment exactly performs a sequential energization and simultaneous deenergization of plural loads continuously and repeatedly, even if there occurs any trouble such as disconnection in one or more of plural loads, since a triac of the succeeding stage is separated triggered by a corresponding transistor, irrespective of the operation of triac of the preceding stage. In the electric circuit of this embodiment, all loads are kept as they are deenergized for a predetermined period of time thus highly improving the operational effect of the circuit.

In the electric circuit of this embodiment, a triac is triggered by a transistor, irrespective of the operation of a triac of preceding stage. Therefore, if there happens any trouble such as disconnection in one or more of plural AC loads, the circuit repeatedly performs a sequential energization and simultaneous deenergization of loads, neglecting the load in trouble, and draws a clear cut between the energization and deenergization of loads, neglecting the load in trouble, and draws a clear cut between the energization and deenergization of loads, since all loads are maintained as they are deenergized for a predetermined period of time, so that the operational effect of the circuit is highly enhanced.

The electric circuit for operating a plurality of AC loads in sequence according to the present invention has many advantages that mechanical trouble is entirely eliminated and the structure is simple, since no mechanical type electrical contact is used; the application is widened and handling is easy, since AC in commercial use is utilized as a power source, instead of a battery; and a manual operation is not required. Other advantages are alluded to in each embodiment.

Three loads are employed in the circuit throughout the four embodiments disclosed, but needless to say, the number of loads may be increased according to necessity, with corresponding number of circuit having a circuit connection similar to the second or third stage of each embodiment additionally interconnected. The AC load may be a motor or solenoid, instead of a fluorescent lamp, according to the application of this electric circuit.

What is claimed is:

1. An electric circuit for operating AC loads sequentially wherein a plurality of loads are sequentially energized and then deenergized substantially simultaneously after said loads are all energized, comprising in combination: a plurality of stages each comprising at least a transistor; a time constant circuit including a capacitor; means connecting said transistor to said capacitor to control charging thereof; a Zener diode; a controlled rectifier element connected to a corresponding one of said loads; means connecting said capacitor to a gate of said controlled rectifier element through said Zener diode for causing Zener current to flow through said Zener diode to said gate of said controlled rectifier element when the voltage across said capacitor of said time constant circuit is raised to exceed the Zener voltage in a time predetermined by the time constant of said circuit whereby said controlled rectifier element is turned on, thereby energizing the load.

2. An electric circuit for operating a plurality of AC loads sequentially from an AC power source, comprising in combination: a plurality of stages each comprising a bridge rectifier circuit, a load connected at one of terminals thereof to one of terminals of the power source and at other terminal to one of AC sides of said bridge rectifier circuit, the other AC side of said bridge rectifier circuit being connected to the other terminal of the source, a SCR connected between the DC sides of said bridge rectifier circuit, said SCR turning on to shunt the DC side so as to energize the load, said SCR being controlled by a transistor circuit including a transistor which transistor circuit flows current to a gate of said SCR after said transistor of said circuit becomes nonconductive, means interconnecting said transistor circuits of said stages with respectively preceding stages for energizing said plurality of AC loads sequentially and for biasing said transistors of respective stages conductive to turn off the SCR's of said stages after said plurality of AC loads are all energized.

3. An electric circuit for operating a plurality of AC loads sequentially from an AC power source, comprising in combination: a plurality of stages each comprising a triac, an AC load connected at one terminal thereof to one of terminals of the power source and at the other terminal to an anode of said triac, and a transistor circuit connected to a gate of said triac and including a Zener diode and a time constant circuit including a capacitor, said capacitor supplying gate current to the triac from the capacitor to energize the corresponding load at a certain time interval after the load of preceding stage is energized, and cuts off the gate current of the triac to deenergize the corresponding load substantially simultaneously when the load of preceding stage is deenergized; and another stage and means connecting same to the transistor circuit of the first of said plurality of stages, for rendering the triac of first stage turned off so as not to flow current to the load only for a period of time while charging of said capacitor of said time constant circuit is being effected after the load of last stage of said plurality of stages becomes deenergized.

4. An electric circuit for operating a plurality of AC loads sequentially, comprising in combination: a plurality of stages and a control circuit; said plurality of stages each including an AC load connected at one terminal thereof to one terminal of a power source and at the other terminal to one of the AC sides of a bridge rectifier circuit, a transformer having a primary side connected across said AC load and a secondary side, a time constant circuit including a capacitor, a Zener diode, a transistor adapted to be biased conductive by said capacitor through said Zener diode, an SCR and means connecting said SCR and transistor for causing said SCR to energize the load upon said transistor becoming conductive, said time constant circuit, transistor and SCR of at least one of said stages being connected to said secondary side of said transformer of a prior stage; said control circuit including a further transformer connected to said plurality of stages for causing all capacitors of said time constant circuits of said plurality of stages to discharge to bias said transistor of each thereof nonconductive, so that the corresponding SCR thereof is turned off, thereby deenergizing of said loads.

5. An electric circuit for operating plural AC loads sequentially wherein said plurality of AC loads are energized in sequence and deenergized substantially simultaneously, comprising in combination: a plurality of stages each including an AC load and a triac in series connection with each other and connected in parallel with respect to an AC power source, each stage having a time constant circuit and a Zener diode and a transistor circuit including transistors, means connecting one of said transistors to said time constant circuit through said Zener diode for rendering said one transistor conductive through said time constant circuit and Zener diode when a further transistor of the preceding stage becomes nonconductive, said one transistors of said stages being connected to the gates of the corresponding ones of said triacs; each of said triacs being triggered by said one transistor irrespective of operation of the triac of preceding stage and thereby energizing the corresponding load.

6. The circuit of claim 1 in which each of said stages includes a bridge rectifier having a pair of AC terminals and a pair of DC terminals, an AC source in series loop with the AC load associated with each of said stages and with the AC terminals of the bridge rectifier of each of said stages, means connecting the controlled rectifier of each said stage across the DC terminals of the corresponding bridge rectifier for energizing said load through said bridge rectifier upon conduction of said SCR, a transformer in each said stage, means connecting the input side of each said transformer to said DC terminals of the bridge rectifier circuit of the corresponding stage for allowing current flow through said transformer from said AC source at a level less than that required to energize the corresponding load and while the corresponding SCR is nonconductive, means connecting the output side of each said transformer to the transistor the next stage for energizing said transistors, said transistors being connected to the corresponding ones of said capacitors for controlling charging thereof.

7. The circuit of claim 2 including a further stage in addition to said plurality of stages, said further stage including a further transistor circuit having time delay means, means coupling said transistor circuit to the SCR of the last energized one of said plurality of stages at the input side of said further transistor circuit, means coupling the output side of said further transistor circuit to the transistor circuit of the first energized one of said plurality of stages for rendering said first energized one of said stages deenergized at a fixed time interval after energization of the last energized one of said stages and means interconnecting said stages for substantially immediately turning off the SCRs thereof upon turning off of the SCR of said first energized stage.

8. The circuit of claim 3 in which said transistor circuit of at least one of said plurality of stages includes a first transistor and means connecting same to the triac of the preceding stage and to said capacitor of said one stage for permitting charging of said said capacitor in response to the conduction of said triac of said preceding stage through the load of said preceding stage and a second transistor connected from the gate of the triac of said one stage through said Zener diode to said capacitor of said one stage for rendering said triac conductive through the load of said one stage after said capacitor of said one stage has achieved a preselected level of change.

9. The circuit of claim 3 in which the transistor circuit of each of said plurality of stages includes a first transistor connected to the gate of the corresponding triac for holding said triac nonconductive when said first transistor is conductive, means coupling said capacitor to said first transistor for rendering said first transistor nonconductive after a time delay, means in each of said stages except the first energized stage for charging said capacitor thereof in response to conduction of the triac of the preceding stage, said another stage including a second transistor and means connecting same to the triac of the last energized stage of said plurality of stages for rendering said second transistor nonconductive upon conduction of said last-mentioned triac, said another stage including a further capacitor and means coupling same to said second transistor for charging thereof upon nonconduction of said second transistor to effect a time delay after energization of said load of said last energized stage of said plurality of stages and means rendering said first transistor of said first energized stage conductive to turn off said triac of said first energized stage upon charging to a preselected level of said second capacitor whereby to effect a delay in deenergization of said load of said first energized stage after energization of the load of the last energized stage, said another stage including a third transistor responsive to conduction of said second transistor for turning off, and means connecting said third transistor to said capacitor of said first stage for preventing charging thereof to a level sufficient to cause energization of said triac of said first energized stage when said third transistor is conductive.

10. The circuit of claim 4 in which said control circuit includes a further transistor and clamping means connecting same to said capacitors of said plurality of stages for clamping same in a discharged condition in response to conduction of said further transistor so that the transistor of said plurality of stages are switched to deenergize the loads thereof, said control circuit including a further capacitor and means connecting same to said further transistor for rendering same conductive after a delay starting with the energization of the load of the last of said plurality of stages.

* * * * *